(12) United States Patent
Eble

(10) Patent No.: US 11,699,267 B1
(45) Date of Patent: Jul. 11, 2023

(54) COHERENT OCCLUSION OF OBJECTS

(71) Applicant: Apple Inc., Cupertino, CA (US)

(72) Inventor: Tobias Eble, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/158,238

(22) Filed: Jan. 26, 2021

Related U.S. Application Data

(60) Provisional application No. 63/000,177, filed on Mar. 26, 2020.

(51) Int. Cl.
*G06T 19/00* (2011.01)
*G06T 15/50* (2011.01)
*G06T 7/00* (2017.01)
*G06T 7/90* (2017.01)

(52) U.S. Cl.
CPC .............. *G06T 19/006* (2013.01); *G06T 7/90* (2017.01); *G06T 7/97* (2017.01); *G06T 15/50* (2013.01)

(58) Field of Classification Search
None
See application file for complete search history.

(56) References Cited

U.S. PATENT DOCUMENTS

| | | | |
|---|---|---|---|
| 2012/0154425 A1* | 6/2012 | Kim | A63F 13/65 345/592 |
| 2018/0046738 A1* | 2/2018 | Park | G06T 19/006 |
| 2019/0279407 A1* | 9/2019 | McHugh | G06T 11/60 |
| 2019/0310756 A1* | 10/2019 | Vathauer | G06F 3/04842 |
| 2020/0082629 A1* | 3/2020 | Jones | G06T 7/70 |

OTHER PUBLICATIONS

Buchmann et al.; "Interaction With Partially Transparent Hands And Objects;" Australian Computer Society, Inc. This paper appeared at the 6th Australasian User Interface Conference (AUIC2005), Newcastle. Conferences in Research and Practice in Information Technology, vol. 40, 4 pages (Year: 2005).*

* cited by examiner

*Primary Examiner* — Edward Martello
(74) *Attorney, Agent, or Firm* — Fernando & Partners, LLP

(57) ABSTRACT

In one implementation, a method of displaying overlapping objects is performed at a device including an optical see-through display, one or more processors, and a non-transitory memory. The method includes obtaining a request to display a first object in front of a second object. The method includes modifying a transparency of the first object in a region corresponding to an overlap between the first object and the second object. The method includes displaying the first object in front of the second object while maintaining visibility of the second object through the overlap between the first object and the second object based on the modified transparency.

25 Claims, 13 Drawing Sheets

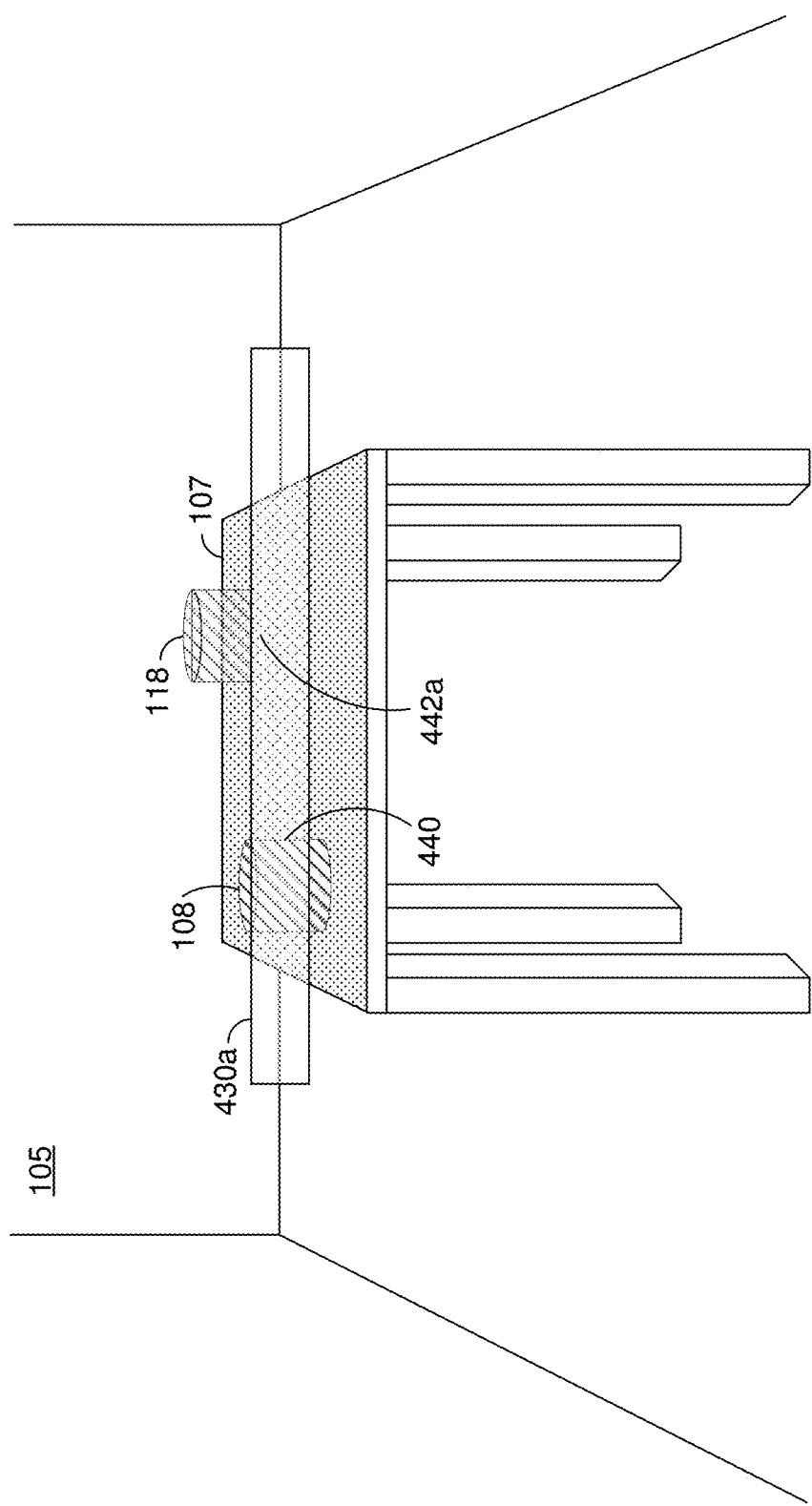

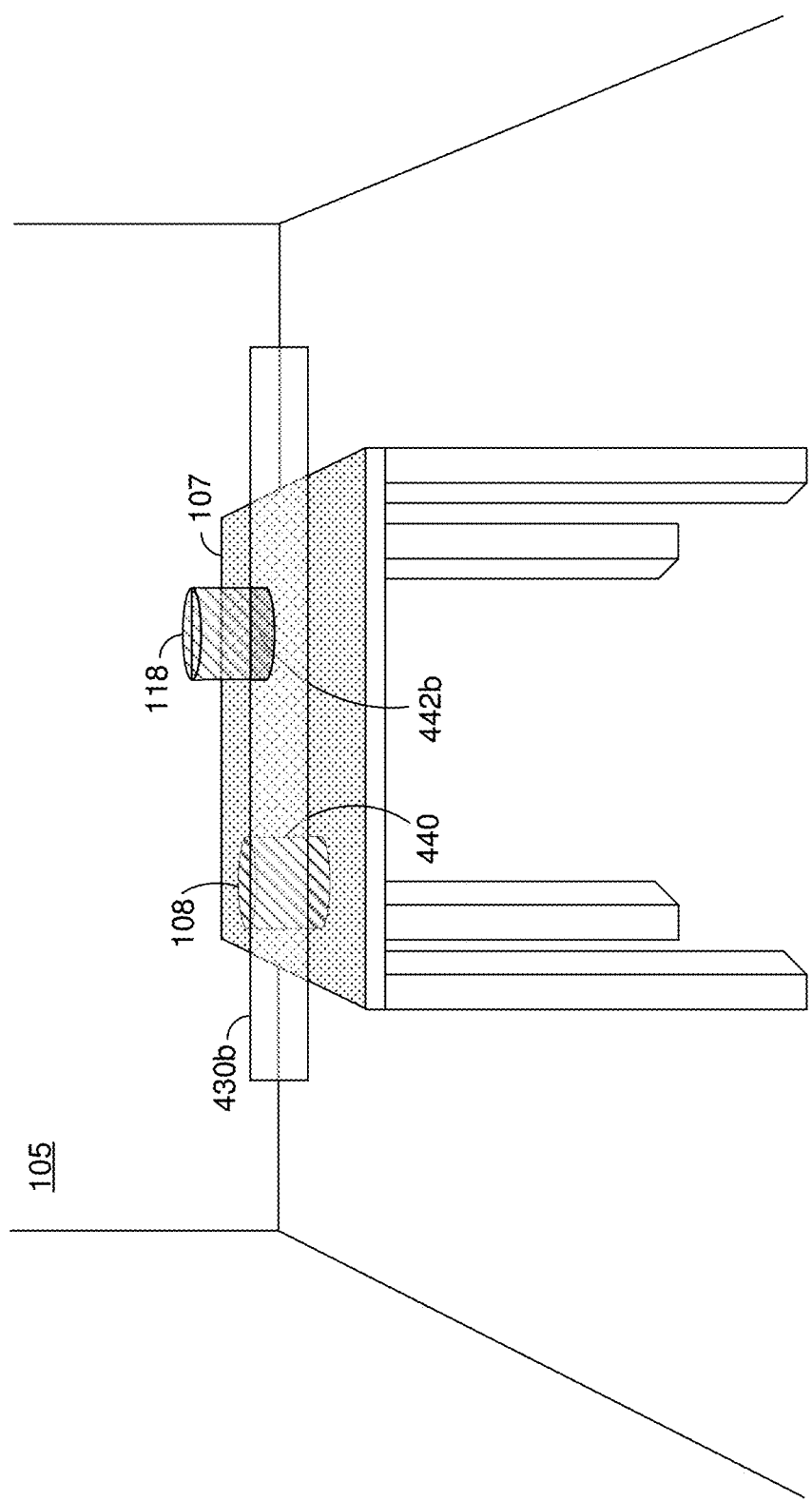

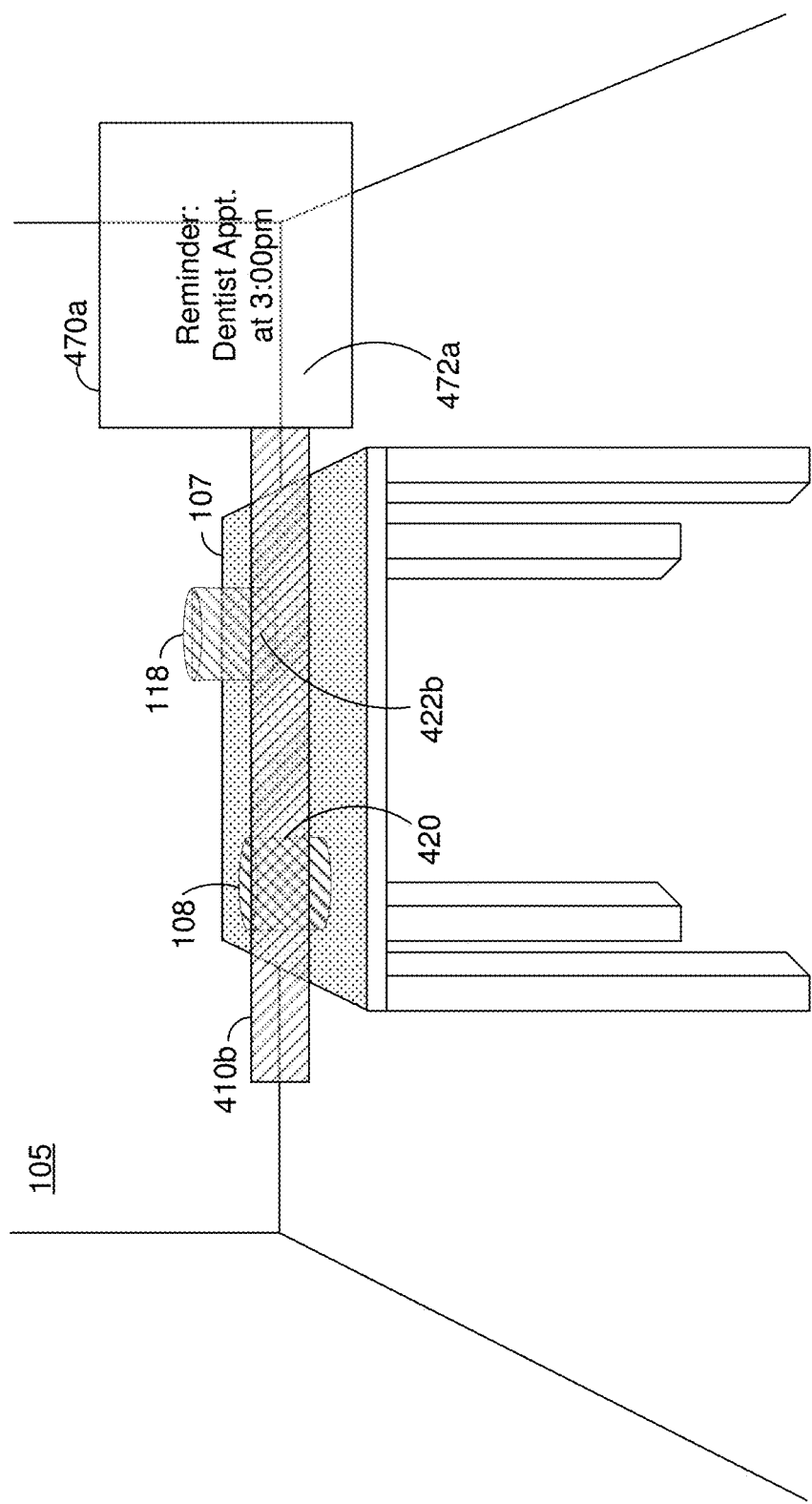

500

| At a device including an optical see-through display, one or more processors, and a non-transitory memory: | ⟵ 510 |

Obtaining a request to display a first object in front of a second object

Modifying a transparency of the first object in a region corresponding to an overlap between the first object and the second object ⟵ 520

Displaying the first object in front of the second object while maintaining visibility of the second object through the overlap between the first object and the second object based on the modified transparency ⟵ 530

Figure 5

COHERENT OCCLUSION OF OBJECTS

CROSS-REFERENCE TO RELATED APPLICATIONS

This application claims priority to U.S. Provisional Patent App. No. 63/000,177, filed on Mar. 26, 2020, and hereby incorporated by reference herein in its entirety.

TECHNICAL FIELD

The present disclosure generally relates to optical see-through displays and, in particular, to systems, methods, and devices for coherent occlusion of objects on optical see-through displays.

BACKGROUND

In various implementations, when displaying a first object on an optical see-through display in a physical environment, the first object is partially transparent and real objects in the physical environment are visible through the first object. However, when displaying the first object over a displayed second object, the second object can be displayed such that the second object is not visible through the second object. In such a way, the second object and the real object are viewed differently, potentially detracting from the perceived reality of the second object.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4G illustrate perspective views of an XR environment with overlapping virtual objects in accordance with various implementations.

FIG. 5 is a flowchart representation of a method of displaying overlapping objects in accordance with some implementations.

Figure 1A:
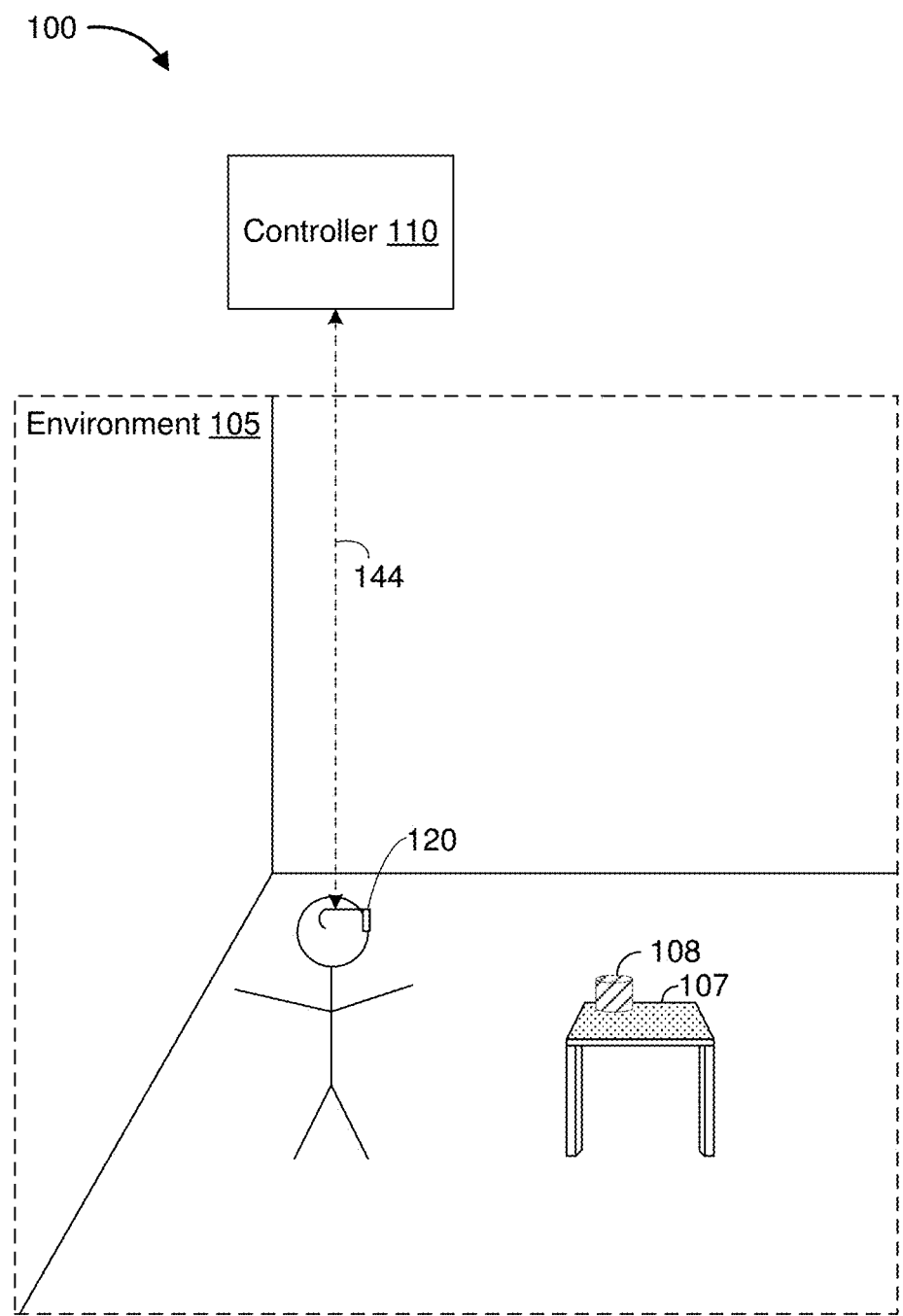
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for coherently displaying object on an optical see-through display. In various implementations, a method is performed at a device including an optical see-through display, one or more processors, and a non-transitory memory. The method includes obtaining a request to display a first object in front of a second object. The method includes modifying a transparency of the first object in a region corresponding to an overlap between the first object and the second object. The method includes displaying the first object in front of the second object while maintaining visibility of the second object through the overlap between the first object and the second object based on the modified transparency.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Various head-mounted devices (HMDs) include an optical see-through display that is at least partially transparent. Thus, a user wearing the HMD can see through the optical see-through display to view the physical environment in which the user is present.

The optical see-through display includes light-emitting pixels. The light-emitting pixels can be controlled to present an image to the user. However, in various implementations, the light-emitting pixels (and/or spaces between the light-emitting pixels) are at least partially transparent. Thus, the light-emitting pixels do not block light from the physical environment from reaching the eye of the user, but only add light to the light from the physical environment. Thus, in various implementations, the optical see-through display is an additive display.

In various implementations, because the optical see-through display is an additive display, displaying overlapping virtual objects can result in inconsistencies. For example, while virtual text (or another virtual object) in front of a real object cannot be rendered to occlude the real object, virtual text in front a virtual object can be rendered to occlude the virtual object. In particular, the portion of the virtual object behind the virtual text is neither rendered nor displayed by the additive display. This may disadvantageously highlight the difference between the real object and the virtual object, degrading the user experience.

Accordingly, in various implementations, the portion of the virtual object behind the virtual text is rendered such that the portion of the real object behind the virtual text and the portion of the virtual object behind the virtual text appear similar, e.g., the portion of the virtual object behind the virtual text is obscured, but not occluded.

FIG. 1A is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes a controller 110 and a head-mounted device (HMD) 120 within a physical environment 105 including a table 107 and a real cylinder 108 upon the table 107.

In some implementations, the controller 110 is configured to present XR content to the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the real environment 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of the HMD 120.

According to some implementations, the HMD 120 displays XR content to the user while the user is virtually and/or physically present within the physical environment 105.

Figure 1B:
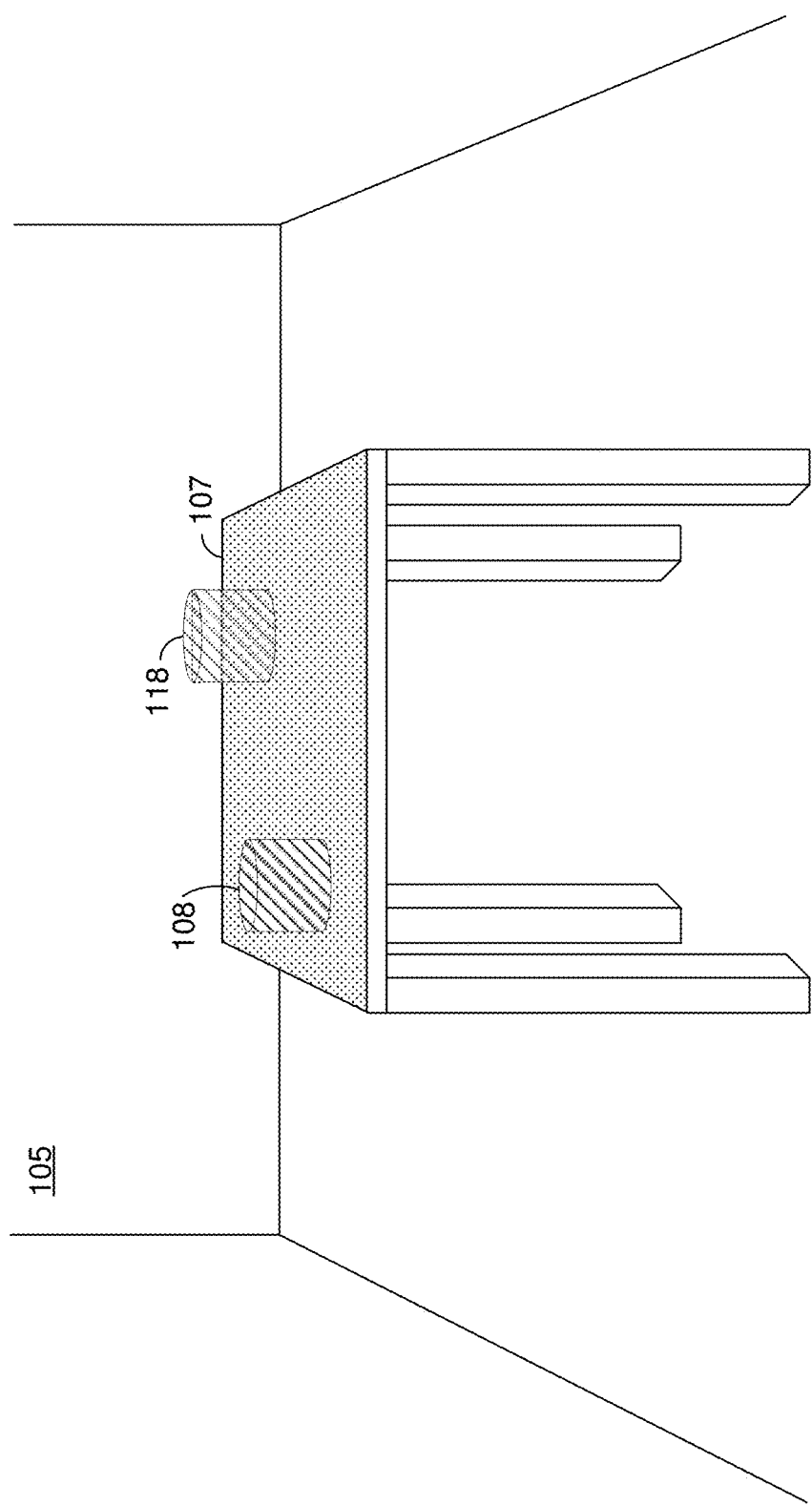
FIG. 1B is a perspective view of an XR environment in accordance with some implementations.

For example, FIG. 1B illustrates the physical environment 105 from the perspective of the user in which the table 107 and the real cylinder 108 is visible. Also visible is a virtual cylinder 118 (displayed by the HMD 120) upon the table 107. As shown in FIG. 1B, the table 107 is partially visible through the virtual cylinder 118, but not through the real cylinder 108. In some implementations, the HMD 120 includes a suitable combination of software, firmware, and/ or hardware. The HMD 120 is described in greater detail below with respect to FIG. 3A. In some implementations, the functionalities of the controller 110 are provided by and/or combined with the HMD 120.

In some implementations, the user wears the HMD 120 on his/her head. As such, the HMD 120 includes one or more XR displays provided to display the XR content. For example, in various implementations, the HMD 120 encloses the field-of-view of the user. In some implementations, the HMD 120 is replaced with a handheld device (such as a smartphone or tablet) configured to present XR content, and rather than wearing the HMD 120 the user holds the device with a display directed towards the field-of-view of the user and a camera directed towards the physical environment 105. In some implementations, the handheld device can be placed within an enclosure that can be worn on the head of the user. In some implementations, the HMD 120 is replaced with an XR chamber, enclosure, or room configured to present XR content in which the user does not wear or hold the HMD 120.

Figure 2:
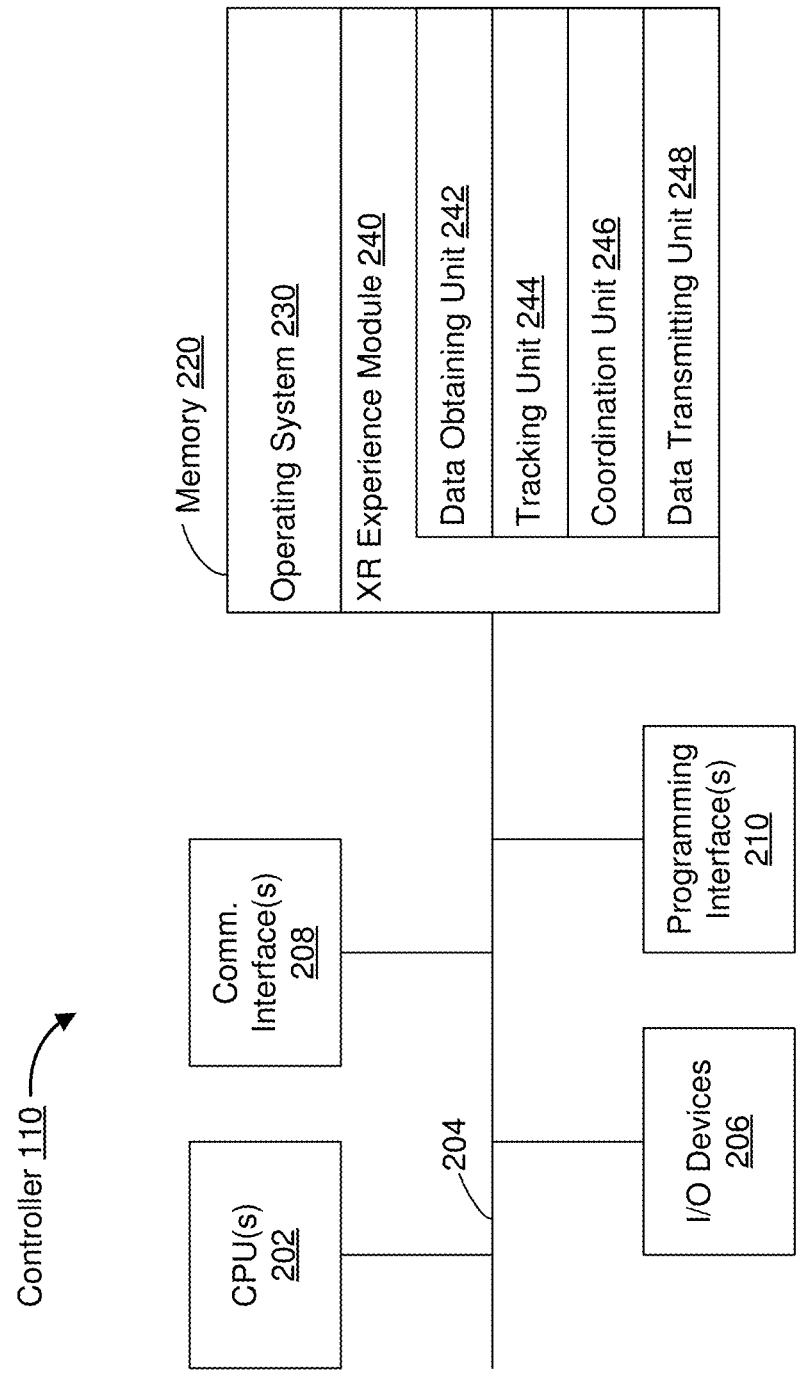
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120 of FIG. 1A. To that end, in various implementations, the data obtaining unit 242 includes instructions and/or logic therefor, and heuristics and metadata therefor.

In some implementations, the tracking unit 244 is configured to map the scene (e.g., the physical environment 105) and to track the position/location of at least the HMD 120 with respect to the scene (e.g., the physical environment 105 of FIG. 1A). To that end, in various implementations, the tracking unit 244 includes instructions and/or logic therefor, and heuristics and metadata therefor.

In some implementations, the coordination unit 246 is configured to manage and coordinate the XR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3A:
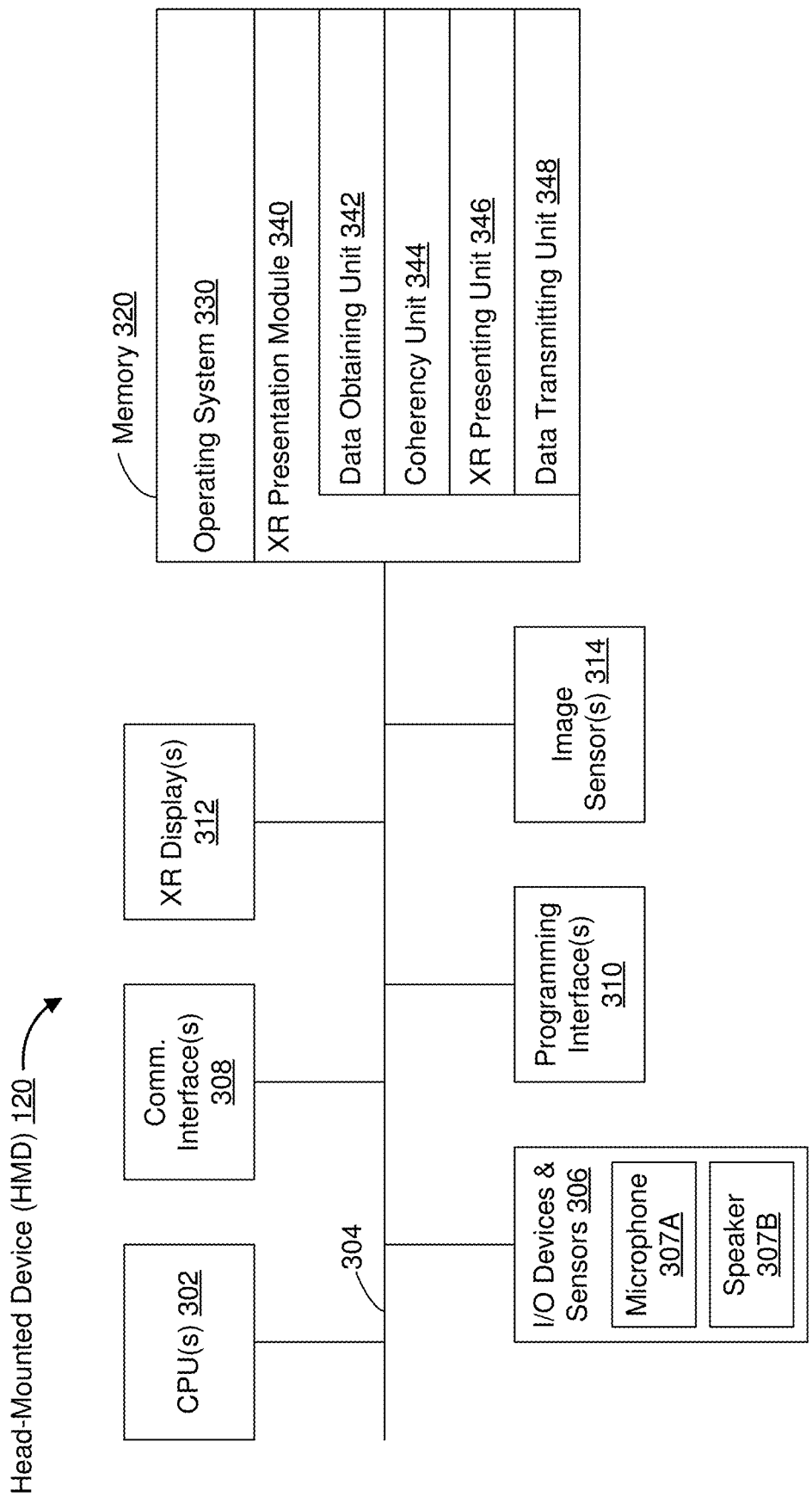
FIG. 3A is a block diagram of an example head-mounted device (HMD) in accordance with some implementations.

FIG. 3A is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the HMD 120 includes a single XR display. In another example, the HMD 120 includes an XR display for each eye of the user. In some implementations, the one or more XR displays 312 are capable of presenting AR, MR, and/or VR content.

Figure 3B:
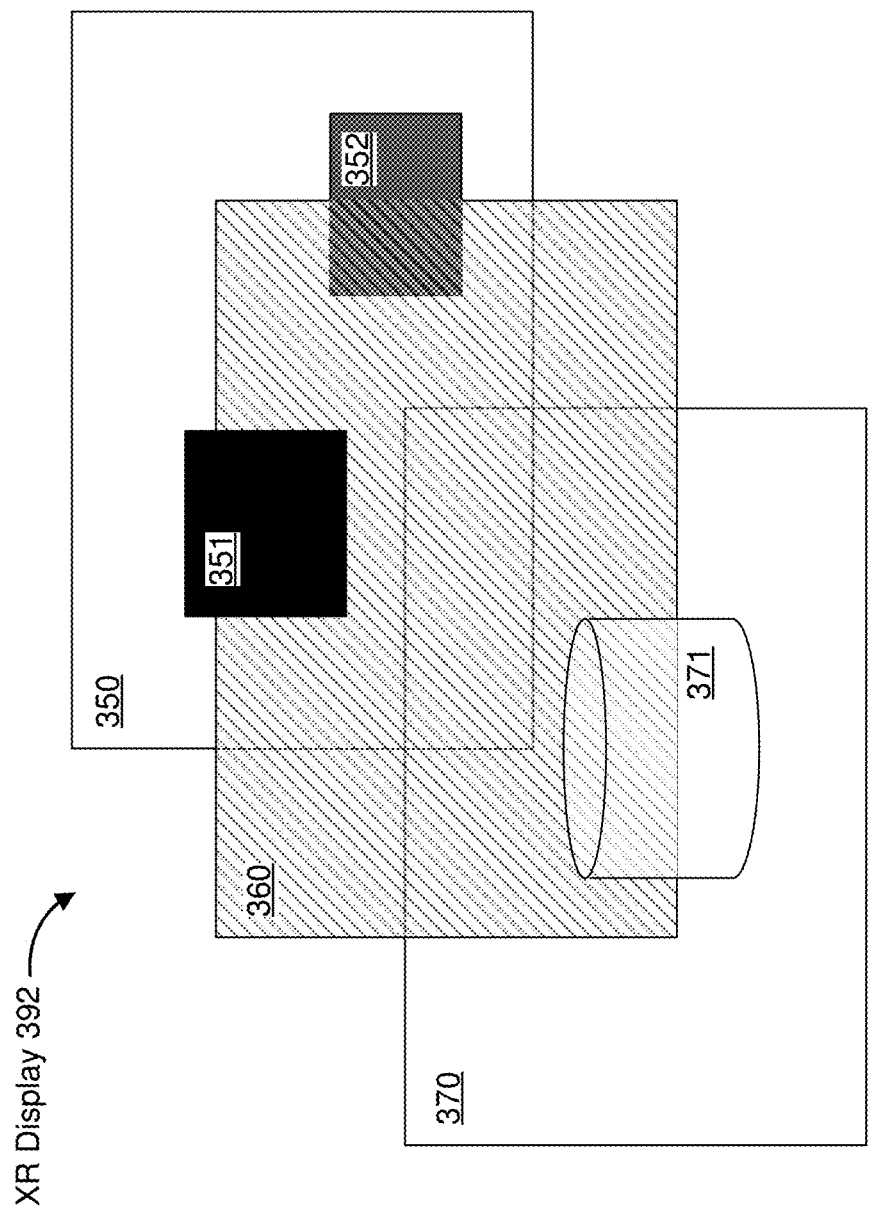
FIG. 3B is a blow-up view of an example XR display in accordance with some implementations.

In various implementations, the one or more XR displays 312 are video passthrough displays which display at least a portion of the physical environment 105 as an image captured by a scene camera. In various implementations, the one or more XR displays 312 are optical see-through displays which are at least partially transparent and pass light emitted by or reflected off the physical environment 105. FIG. 3B illustrates a blow-up view of an optical see-through XR display 392 in accordance with some implementations. In various implementations, the optical see-through XR display 392 includes a selectively occlusive layer 350 that includes a number of pixel elements that, when activated, block light from passing through the optical see-through XR display 392. Thus, through appropriate addressing of the selectively occlusive layer 350, the optical see-through XR display 392 can render a black region 351 or a gray region 352. In various implementations, the optical see-through XR display 392 includes a globally dimmable layer 360 that, according to a controllable dimming level, dims light passing through the optical see-through XR display 392. In various implementations, the globally dimmable layer 360 includes one or more of a photochromic element, electrochromic element, an SPD (suspended-particle device) element, GHLC (guest-host liquid crystal) element, or PDLC (polymer-dispersed liquid-crystal) element. In various implementations, the optical see-through XR display 392 includes a light addition layer 370 that includes a number of pixel elements that, when activated, emit light towards the user. Thus, through appropriate addressing of the light addition layer 370, the optical see-through XR display 392 can render a white (or colored) virtual object 371. In various implementations, the optical see-through XR display 392 does not include each of the layers 350, 360, 370. In particular, in various implementations, the optical see-through XR display 392 does not include the selectively occlusive layer 350 and/or the globally dimmable layer 360. In various implementations, the optical see-through XR display 392 does not include the light addition layer 370 and/or the globally dimmable layer 360. In various implementations, the optical see-through XR display 392 does not include the selectively occlusive layer 350 and/or the light addition layer 370.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the physical environment as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a coherency unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1A. To that end, in various implementations, the data obtaining unit 342 includes instructions and/or logic therefor, and heuristics and metadata therefor.

In some implementations, the coherency unit 344 is configured to modify the transparency of at least a portion of a first displayed object in front of a second displayed object. To that end, in various implementations, the coherency unit 344 includes instructions and/or logic therefor, and heuristics and metadata therefor.

In some implementations, the XR presenting unit 346 is configured to present XR content via the one or more XR displays 312. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the coherency unit 344, the XR presenting unit 346, and the data transmitting unit 348 are shown as residing on a single device (e.g., the HMD 120 of FIG. 1A), it should be understood that in other implementations, any combination of the data obtaining unit 342, the coherency unit 344, the XR presenting unit 346, and the data transmitting unit 348 may be located in separate computing devices.

Moreover, FIG. 3A is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3A could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
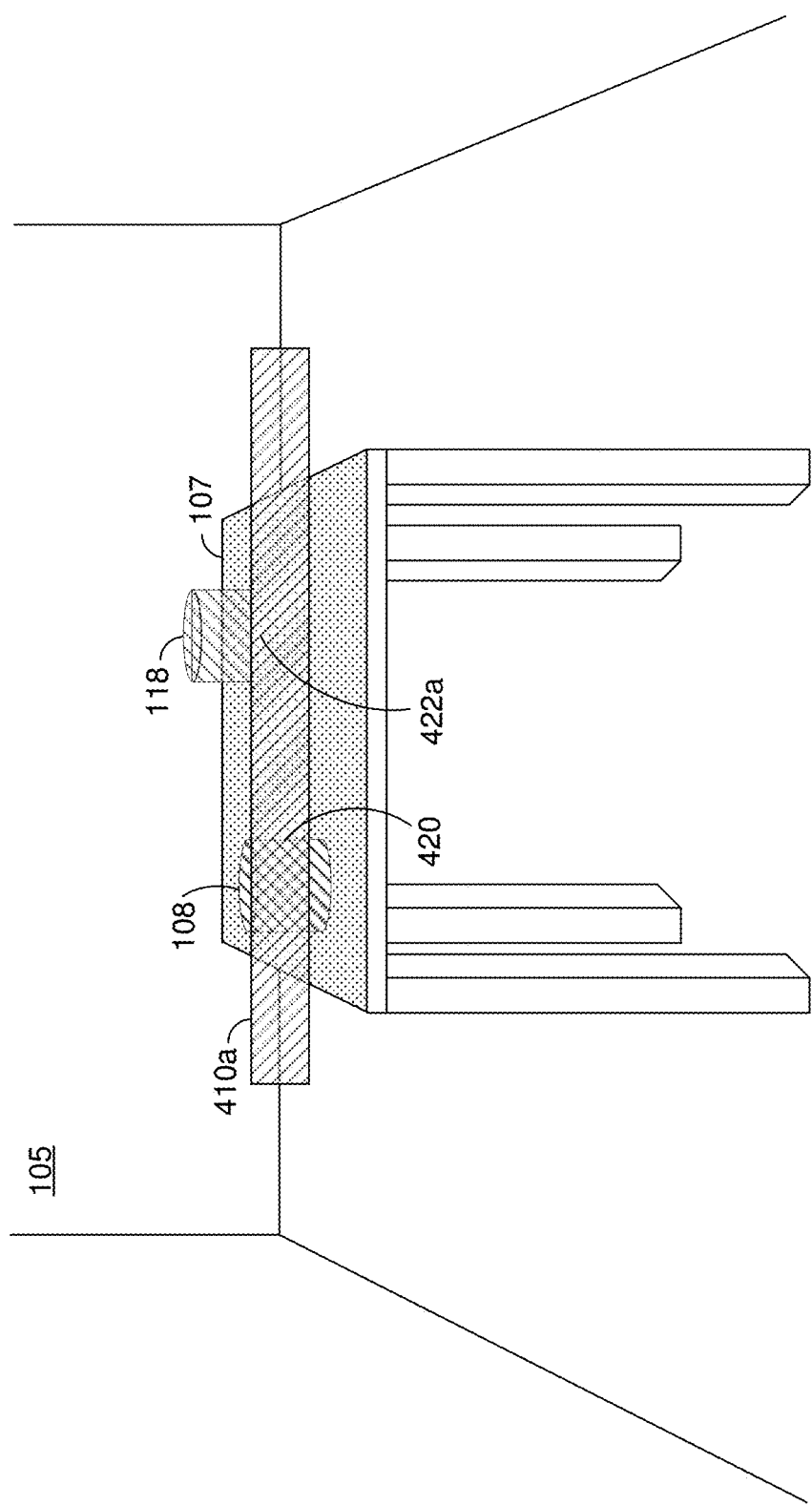

FIG. 4A illustrates the physical environment 105 of FIG. 1A from the perspective of the user in which the table 107 and the real cylinder 108 are visible. Also visible is a virtual cylinder 118 (displayed by the HMD 120) upon the table 107. The table 107 is partially visible through the virtual cylinder 118, but not through the real cylinder 108.

In FIG. 4A, the real cylinder 108 is a first color (e.g., green) and the virtual cylinder 118 is the same first color. Also visible is a first virtual rectangle 410a of a second color (e.g., red) in front of the table 107, the real cylinder 108, and the virtual cylinder 118. The table 107 and the real cylinder 108 are partially visible through the first virtual rectangle 410a. However, the virtual cylinder 118 is not visible through the first virtual rectangle 410a. In particular, the real cylinder 108 is partially visible at an overlap region 420 of the real cylinder 108 and the first virtual rectangle 410a. Thus, the color of the overlap region 420 is a combination of the first color and the second color. However, the virtual cylinder 118 is not visible at an overlap region 422a of the virtual cylinder 118 and the first virtual rectangle 410a (e.g., the HMD 120 does not render or display the virtual cylinder 118 at the overlap region 422a). Thus, the color of the overlap region 422a is a combination of the second color and the color of the table.

The occlusion of the virtual cylinder 118 at the overlap region 422a as compared to the visibility of real cylinder 108 at the overlap region 420 may emphasize to a user that the virtual cylinder 118 is virtual and not real. Such an emphasis may detract from an XR experience in which the virtual cylinder 118 is intended to be perceived as real by a user.

Figure 4B:
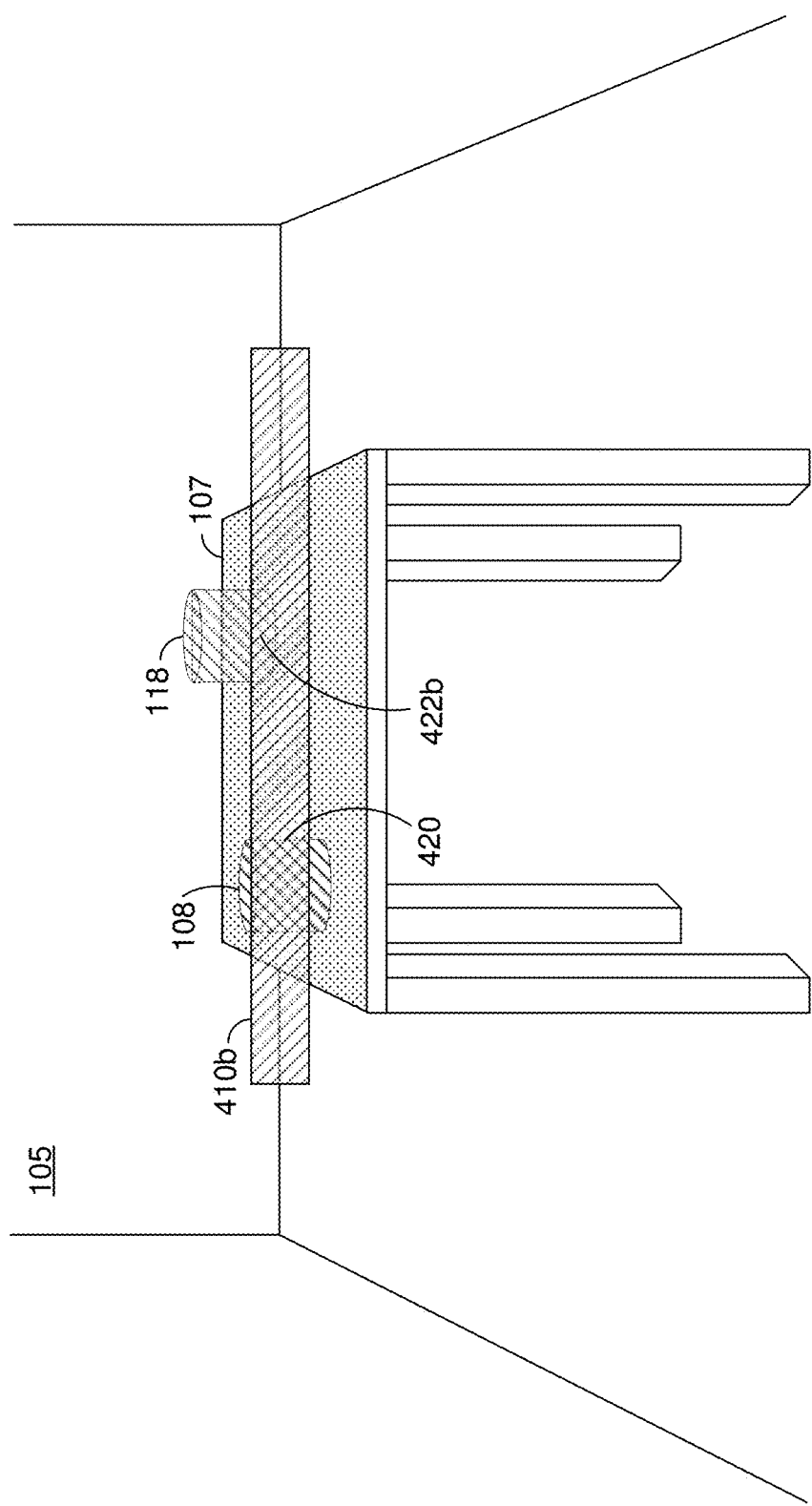

FIG. 4B illustrates the physical environment 105 of FIG. 4A in which the first virtual rectangle 410a is replaced with a second virtual rectangle 410b with modified transparency at an overlap region 422b of the virtual cylinder 118 and the second virtual rectangle 410b. Thus, the table 107, the real cylinder 108, and the virtual cylinder 118 are partially visible through the second virtual rectangle 410b. In particular, the real cylinder 108 is partially visible at the overlap region 420 of the real cylinder 108 and the second virtual rectangle 410b. Thus, the color of the overlap region 420 is a combination of the first color and the second color. Further, the virtual cylinder 118 is visible at the overlap region 422b. Thus, the color of the overlap region 422b is a combination of the first color and the second color (and the color of the table).

FIG. 4C illustrates the physical environment 105 of FIG. 4A in which the first virtual rectangle 410a is replaced with a third virtual rectangle 430a that is white. The table 107 and the real cylinder 108 are partially visible through the third virtual rectangle 430a. However, the virtual cylinder 118 is not visible through the third virtual rectangle 430a. In particular, the real cylinder 108 is partially visible at an overlap region 440 of the real cylinder 108 and the third virtual rectangle 430a. Thus, the color of the overlap region 440 is the first color (brightened by the white of the third virtual rectangle 430a). However, the virtual cylinder 118 is not visible at an overlap region 442a of the virtual cylinder 118 and the third virtual rectangle 430a. For example, in FIG. 4C, the HMD 120 does not render or display the virtual cylinder 118 at the overlap region 442a. Further, in various implementations, the HMD 120 could not display the virtual cylinder 118 at the overlap region 442a because displaying the third virtual rectangle 430a activates all the light-emitting pixels of the region at full strength. Thus, the color of the overlap region 442a is the color of the table (brightened by the white of the third virtual rectangle 430a).

FIG. 4D illustrates the physical environment 105 of FIG. 4C in which the third virtual rectangle 430a is replaced with a fourth virtual rectangle 430b with modified transparency (and brightness) at an overlap region 442b of the virtual cylinder 118 and the fourth virtual rectangle 430b. Thus, the table 107, the real cylinder 108, and the virtual cylinder 118 are partially visible through the fourth virtual rectangle 430b. In particular, the real cylinder 108 is partially visible at the overlap region 440 of the real cylinder 108 and the fourth virtual rectangle 430b. Thus, the color of the overlap region 440 is the first color (brightened by the white of the fourth virtual rectangle 430b). Further, the virtual cylinder 118 is visible at the overlap region 442b. Thus, the color of the overlap region 442b is a combination of the first color (brightened by the fourth virtual rectangle 430b, but not to the extent of the overlap region 440) and the color of the table 107.

Figure 4E:
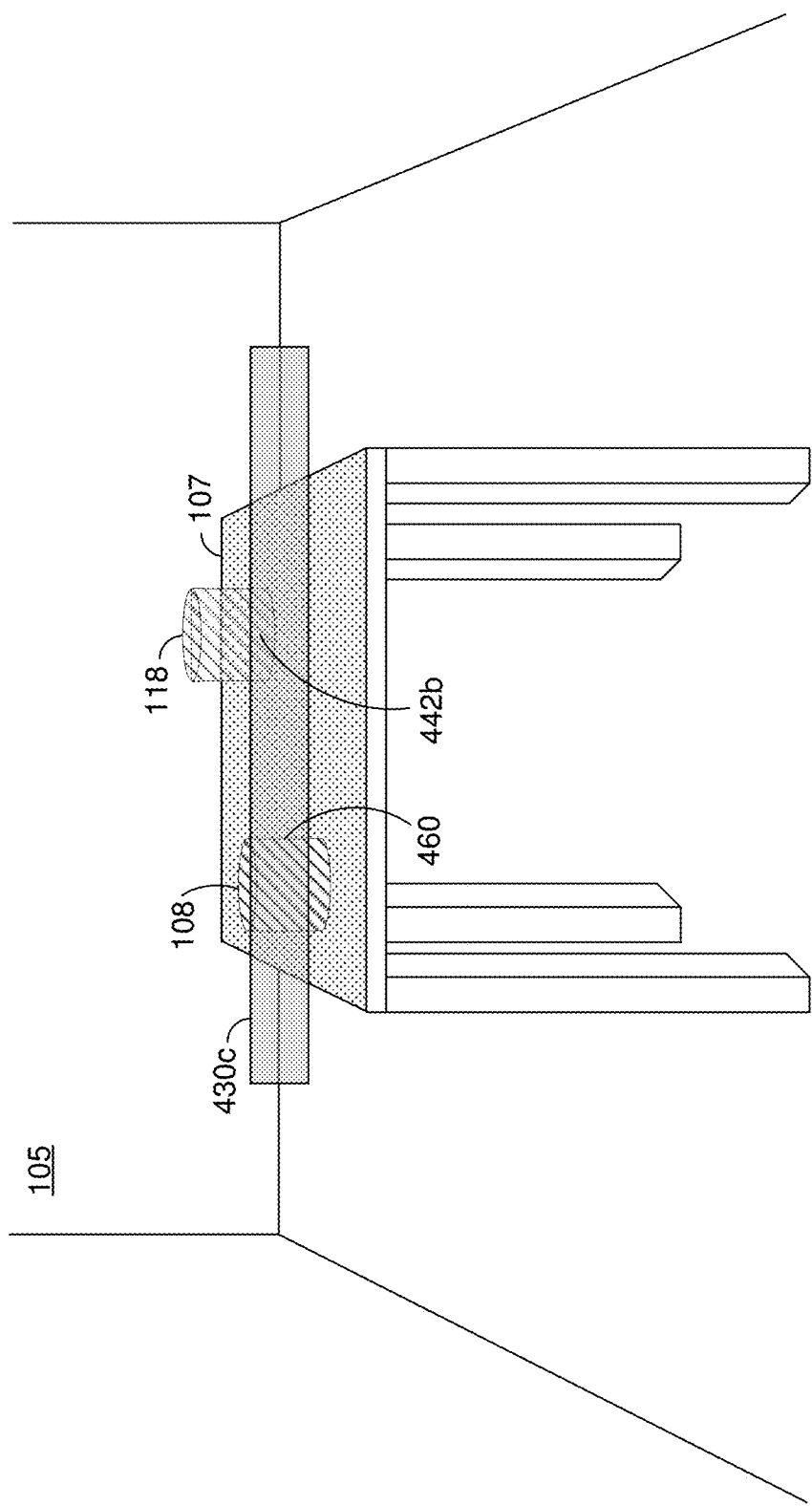

FIG. 4E illustrates the physical environment 105 of FIG. 4C in which the third virtual rectangle 430a is replaced with a fifth virtual rectangle 430c with modified transparency at the overlap region 442b of the virtual cylinder 118 and the fifth virtual rectangle 430c and modified brightness over the entire fifth virtual rectangle 430c. Thus, the fifth virtual rectangle 430c is a shade of gray. Thus, the table 107, the real cylinder 108, and the virtual cylinder 118 are partially visible through the fifth virtual rectangle 430c. In particular, the real cylinder 108 is partially visible at the overlap region 460 of the real cylinder 108 and the fifth virtual rectangle 430c. Thus, the color of the overlap region 460 is the first color (brightened by the light added by the fifth virtual rectangle 430c). Further, the virtual cylinder 118 is visible at the overlap region 442b. Thus, the color of the overlap region 442b is a combination of the first color (brightened by the light added by the fifth virtual rectangle 430c) and the color of the table 107.

FIG. 4F illustrates the physical environment 105 of FIG. 4B in which a first virtual reminder 470a is displayed by the HMD 120. The first virtual reminder 470a is displayed in front of the second virtual rectangle 410b. In FIG. 4F, in an overlap region 472a between the first virtual reminder 470a and the second virtual rectangle 410b, the second virtual rectangle 410b is not visible.

Figure 4G:
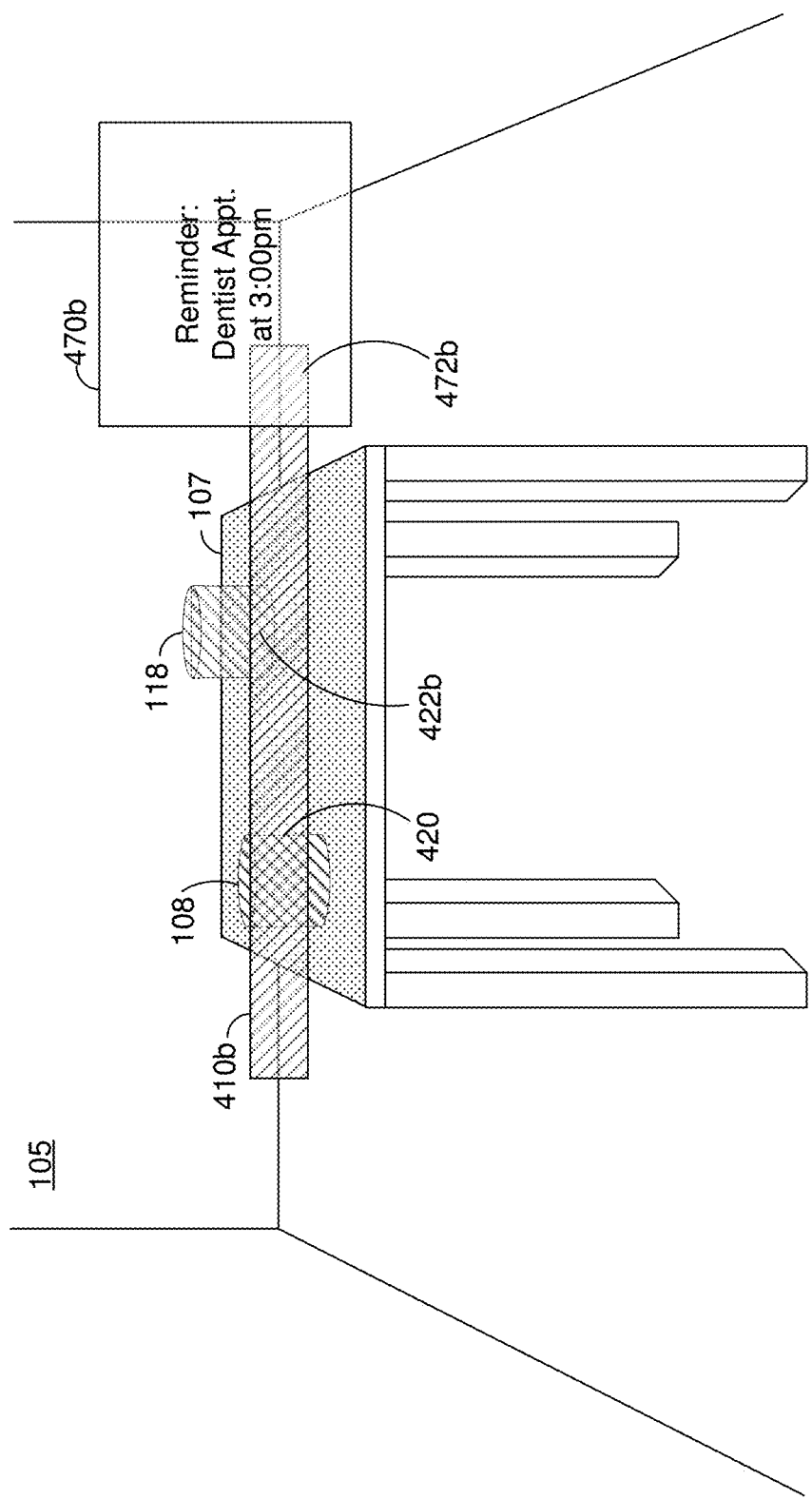

FIG. 4G illustrates the physical environment 105 of FIG. 4F in which the first virtual reminder 470a is replaced with a second virtual reminder 470b with modified transparency at an overlap region 472b between the second virtual reminder 470b and the second virtual rectangle 410b. In FIG. 4G, in the overlap region 472b, the second virtual rectangle 410b is visible.

In various implementations, the HMD 120 determines whether or not to modify the transparency of a displayed first object in front of a displayed second object based on a coherency metric of the second object. In various implementations, the coherency metric is based on a similarity of the second object to a real object in the physical environment. For example, in various implementations, the virtual cylinder 118 has a high coherency metric based on its similarity to the real cylinder 108, whereas the second virtual rectangle 410b has a low coherency metric. Thus, in FIG. 4F, the second virtual rectangle 410a is partially transparent at the overlap region 422b, but the first virtual reminder 470a is not partially transparent at the overlap region 472a.

In various implementations, the coherency metric is based on a realism of the second object. For example, in various implementations, the virtual cylinder 118 has a high coherency metric based on its intention to be perceived as real, whereas the second virtual rectangle 410b has a low coherency metric. Thus, in FIG. 4F, the second virtual rectangle 410b is partially transparent at the overlap region 422b, but the first virtual reminder 470a is not partially transparent at the overlap region 472a.

In various implementations, the coherency metric is based on an amount of overlap between the first object and the second object. For example, if the second object is completely covered or at least a threshold percentage covered by the first object, the coherency metric is lower and the transparency of the first object is less likely to be modified.

FIG. 5 is a flowchart representation of a method 500 of displaying overlapping objects in accordance with some implementations. In various implementations, the method 500 is performed by a device with an optical see-through display, one or more processors, and a non-transitory memory (e.g., the HMD 120 of FIG. 3). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device obtaining a request to display a first object in front of a second object. In various implementations, the request to display the first object in front of the second object is generated by and/or received from an application executed by the device (e.g., an application produced by an application developer). In various implementations, the request is generated by and/or received from a rendering module of the device.

In various implementations, the request to display the first object in front of the second object includes a request to display the first object and a request to display the second object. In various implementations, the request to display the first object includes data indicative of one or more of a shape, location, color, and transparency of the first object or various portions of the first object. In various implementations, the request to display the first object includes an RGBA image. Similarly, in various implementations, the request to display the second object includes data indicative of one or more of a shape, location, color, and transparency of the second object or various portions of the second object. In various implementations, the request to display the second object includes an RGBA image.

In various implementations, the first object is a virtual object and the second object is a virtual object. In various implementations, the first object is an XR object and the second object is an XR object.

For example, in various implementations, the HMD 120 of FIG. 3 receives a request to display a virtual rectangle in front of a virtual cylinder. Thus, in FIG. 4A, the HMD 120 displays a first virtual rectangle 410a in front of the virtual cylinder 118.

The method 500 continues, in block 520, with the device modifying a transparency of the first object in a region corresponding to an overlap between the first object and the second object. The overlap corresponds to a two-dimensional region of the display in which, at a particular point of view, the first object and the second object occupy the same region. For example, in various implementations, the HMD 120 in FIG. 3 modifies a transparency of the virtual rectangle in a region corresponding to an overlap between the first object and the second object. Thus, in FIG. 4B, the HMD 120 modifies the first virtual rectangle 410a into a second virtual rectangle 410b with a modified transparency in the overlap region 422b.

The method 500 continues, in block 530, with the device displaying the first object in front of the second object while maintaining visibility of the second object through the overlap between the first object and the second object based on the modified transparency. In various implementations, displaying the first object in front of the second object includes compositing the first object and the second object into an image. For example, in FIG. 4B, the HMD 120 displays the second virtual rectangle 410b in front of the virtual cylinder 118 while maintaining visibility of the virtual cylinder 118 through the overlap region 422b.

In various implementations, the first object has a color specified by an RGB color triplet including a red value of $R_1$, a green value of $G_1$, and a blue value of $B_1$, e.g., the color $[R_1, G_1, B_1]$. In various implementations, the second object has a color specified by an RGB color triplet including a red value of $R_2$, a green value of $G_2$, and a blue value of $B_2$, e.g., the color $[R_2, G_2, B_2]$. Further, the device is capable of displaying any color with a red value less than $R_{max}$, a green value less than $G_{max}$, and a blue value less than $B_{max}$.

Accordingly, in various implementations, in a non-overlap region of the first object, the device displays the color $[R_1, G_1, B_1]$. Further, in an overlap region of the first object and the second object, the device displays the color $[R_1+\alpha R_2, G_1+\alpha G_2, B_1+\alpha B_2]$, where $\alpha$ is a transparency constant which may be any number between 0 and 1. For example, in FIG. 4B, the HMD 120 displays a non-overlap region of the second virtual rectangle 210b with a red color and the overlap region 222b with a color that is a combination of red and green (e.g., the color of the virtual cylinder 118).

In various implementations, the device may be unable to produce the color $[R_1+\alpha R_2, G_1+\alpha G_2, B_1+\alpha B_2]$ because one or more of the determined color channel values is greater than the respective maximum of the display.

In various implementations, if one of the determined color channel values is greater than the respective maximum of the display, the transparency constant a is reduced. Thus, in various implementations, in the non-overlap region of the first object, the device displays the color $[R_1, G_1, B_1]$. Further, in the overlap region of the first object and the second object, the device displays the color $[R_1+\alpha_{new}R_2, G_1+\alpha_{new}G_2, B_1+\alpha_{new}B_2]$, where $\alpha_{new}$ is selected such that each color channel value is less than or equal to the respective maximum of the display.

In various implementations, if one of the determined color channel values is greater than the respective maximum of the display, the respective maximum is used in the overlap region rather than the determined color channel value. Thus, in various implementations, in the non-overlap region of the first object, the device displays the color $[R_1, G_1, B_1]$. Further, in the overlap region of the first object and the second object, the device displays the color $[\min(R_{max}, R_1+\alpha R_2), \min(G_{max}, G_1+\alpha G_2), \min(B_{max}, B_1+\alpha B_2)]$. For example, in FIG. 4C, the HMD 120 displays the non-overlap region of the third virtual rectangle 430a with a white color and the overlap region 422b with the same white color.

In various implementations, if one of the determined color channel values is greater than the respective maximum of the display, the corresponding color channel of the entire first object is reduced. Thus, in various implementations, in the overlap region of the first object and the second object, the device displays the color [min($R_{max}$, $R_1+\alpha R_2$), min($G_{max}$, $G_1+\alpha G_2$), min($B_{max}$, $B_1+\alpha B_2$)]. Further, in the non-overlap region of the first object, the device displays the color [$R_1 \cdot \min(R_{max}, R_1+\alpha R_2)/(R_1+\alpha R_2)$, $G_1 \cdot \min(G_{max}, G_1+\alpha G_2)/(G_1+\alpha G_2)$, $B_1 \cdot \min(B_{max}, B_1+\alpha B_2)/(B_1+\alpha B_2)$].

In various implementations, if one of the determined color channel values is greater than the respective maximum of the display, the overlap region of the first object and the second object is dimmed (e.g., all color channels are reduced uniformly). Thus, in various implementations, in the non-overlap region of the first object, the device displays the color [$R_1$, $G_1$, $B_1$]. Further, in the overlap region of the first object and the second object, the device displays the color [$\beta(R_1+\alpha R_2)$, $\beta(G_1+\alpha G_2)$, $\beta(B_1+\alpha B_2)$], where $\beta$ is a dimming constant which may be any number between 0 and 1 selected such that each color channel value is less than or equal to the respective maximum of the display. For example, in FIG. 4D, the HMD 120 displays the non-overlap region of the fourth virtual rectangle 430b with a white color and the overlap region 442b with a dimmed green color (e.g., a dimmed version of the color of the virtual cylinder 118).

In various implementations, if one of the determined color channel values is greater than the respective maximum of the display, the entire first object is dimmed (e.g., all color channels are reduced uniformly). Thus, in various implementations, in the non-overlap region of the first object, the device displays the color [$\beta R_1$, $\beta G_1$, $\beta B_1$]. Further, in the overlap region of the first object and the second object, the device displays the color [$\beta(R_1+\alpha R_2)$, $\beta(G_1+\alpha G_2)$, $\beta(B_1+\alpha B_2)$]. For example, in FIG. 4E, the HMD 120 displays the non-overlap region of the fifth virtual rectangle 430c and the overlap region 442b with a dimmed green color (e.g., a dimmed version of the color of the virtual cylinder 118).

Thus, in various implementations, the method 500 further includes modifying a brightness and/or a color of the region corresponding to the overlap between the first object and the second object. In various implementations, the method 500 further includes modifying a brightness and/or a color of the entire first object.

In various implementations, the method 500 includes determining a coherency metric of the second object. In various implementations, the coherency metric is indicative of the effect of maintaining the visibility of the second object through the overlap between the first object and the second object. In various implementations, the method 500 includes determining to modify the transparency of the first object based on the coherency metric, wherein modifying the transparency of the first object in the region corresponding to the overlap between the first object and the second object is performed in response to determining to modify the transparency of the first object.

In various implementations, the coherency metric is based on a similarity of the second object to a real object visible through the optical see-through display. For example, with respect to FIG. 4F, the virtual cylinder 118 has a high coherency metric based on its similarity to the real cylinder 108, whereas the second virtual rectangle 410b has a low coherency metric. Thus, in FIG. 4F, the second virtual rectangle 410b is partially transparent at the overlap region 422b, but the first virtual reminder 470a is not partially transparent at the overlap region 472a.

In various implementations, the coherency metric is based on a realism of the second object. For example, with respect to FIG. 4F, the virtual cylinder 118 has a high coherency metric based on its intention to be perceived as real, whereas the second virtual rectangle 410b has a low coherency metric. Thus, in FIG. 4F, the second virtual rectangle 410b is partially transparent at the overlap region 422b, but the first virtual reminder 470a is not partially transparent at the overlap region 472a.

In various implementations, the coherency metric is based on an amount of overlap between the first object and the second object. For example, if the second object is completely covered or at least a threshold percentage covered by the first object, the coherency metric is lower and the transparency of the first object is less likely to be modified.

As noted above, in various implementations, the request to display the first object in front of the second object in received from an application. In various implementations, the application can be executed by (and the request received by) a device with a video passthrough display and/or a device with an optical see-through device. In various implementations, the request, which is the same for devices with either type of display, describes the first object as opaque. Thus, when rendered on a video passthrough display, the second object is not visible through the overlap region, but when rendered on an optical see-through display, the method 500 is performed and the second object is visible through the overlap region.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises"

and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including an optical see-through display, one or more processors, and a non-transitory memory:
obtaining a request to display a first virtual object in front of a second virtual object;
in response to obtaining the request to display the first virtual object in front of the second virtual object, modifying a transparency of the first virtual object in a region corresponding to an overlap between the first virtual object and the second virtual object; and
displaying the first virtual object in front of the second virtual object while maintaining visibility of the second virtual object through the overlap between the first virtual object and the second virtual object based on the modified transparency.

2. The method of claim 1, further comprising modifying a brightness of the first virtual object in the region corresponding to the overlap between the first virtual object and the second virtual object.

3. The method of claim 1, further comprising modifying a brightness of the entire first virtual object.

4. The method of claim 1, further comprising modifying a color of the first virtual object in the region corresponding to the overlap between the first virtual object and the second virtual object.

5. The method of claim 1, further comprising modifying a color of the entire first virtual object.

6. The method of claim 1, further comprising:
determining a coherency metric of the second virtual object, wherein modifying the transparency of the first virtual object in the region corresponding to the overlap between the first virtual object and the second virtual object is performed in response to determining to modify the transparency of the first virtual object based on the coherency metric.

7. The method of claim 6, wherein the coherency metric is based on a similarity of the second virtual object to a real object visible through the optical see-through display.

8. The method of claim 6, wherein the coherency metric is based on a realism of the second virtual object.

9. The method of claim 6, wherein the coherency metric is based on an amount of the overlap between the first virtual object and the second virtual object.

10. The method of claim 1, wherein modifying the transparency of the first virtual object in the region corresponding to the overlap includes increasing the transparency of the first virtual object in the region corresponding to the overlap.

11. A device comprising:
an optical see-through display;
a non-transitory memory; and
one or more processors to:
obtain a request to display a first virtual object in front of a second virtual object;
in response to obtaining the request to display the first virtual object in front of the second virtual object, modify a transparency of the first virtual object in a region corresponding to an overlap between the first virtual object and the second virtual object; and
display, via the optical see-through display, the first virtual object in front of the second virtual object while maintaining visibility of the second virtual object through the overlap between the first virtual object and the second virtual object based on the modified transparency.

12. The device of claim 11, wherein the one or more processors are further to modify a brightness of the first virtual object in the region corresponding to the overlap between the first virtual object and the second virtual object.

13. The device of claim 11, wherein the one or more processors are further to modify a brightness of the entire first virtual object.

14. The device of claim 11, wherein the one or more processors are further to modify a color of the first virtual object in the region corresponding to the overlap between the first virtual object and the second virtual object.

15. The device of claim 11, wherein the one or more processors are further to modify a color of the entire first virtual object.

16. The device of claim 11, wherein the one or more processors are further to determine a coherency metric of the second virtual object, wherein the one or more processors are to modify the transparency of the first virtual object in the region corresponding to the overlap between the first virtual object and the second virtual object in response to determining to modify the transparency of the first virtual object based on the coherency metric.

17. The device of claim 16, wherein the coherency metric is based on a similarity of the second virtual object to a real object visible through the optical see-through display.

18. The device of claim 16, wherein the coherency metric is based on a realism of the second virtual object.

19. The device of claim 16, wherein the coherency metric is based on an amount of the overlap between the first virtual object and the second virtual object.

20. The device of claim 11, wherein the one or more processors are to modify the transparency of the first virtual object in the region corresponding to the overlap by increasing the transparency of the first virtual object in the region corresponding to the overlap.

21. A non-transitory memory storing one or more programs, which, when executed by one or more processors of a device with an optical see-through display, cause the device to:
obtain a request to display a first virtual object in front of a second virtual object;
in response to obtaining the request to display the first virtual object in front of the second virtual object, modify a transparency of the first virtual object in a region corresponding to an overlap between the first virtual object and the second virtual object; and
display, via the optical see-through display, the first virtual object in front of the second virtual object while maintaining visibility of the second virtual object through the overlap between the first virtual object and the second virtual object based on the modified transparency.

22. The non-transitory memory of claim 21, wherein the one or more programs, when executed by the one or more processors, cause the device to modify the transparency of the first virtual object in the region corresponding to the overlap by increasing the transparency of the first virtual object in the region corresponding to the overlap.

23. The non-transitory memory of claim 21, wherein the one or more programs, when executed by the one or more processors, further cause the device to modify a brightness of the first virtual object in the region corresponding to the overlap between the first virtual object and the second virtual object.

24. The non-transitory memory of claim 21, wherein the one or more programs, when executed by the one or more processors, further cause the device to modify a color of the first virtual object in the region corresponding to the overlap between the first virtual object and the second virtual object.

25. The non-transitory memory of claim 21, wherein the one or more programs, when executed by the one or more processors, further cause the device to determine a coherency metric of the second virtual object, wherein the one or more programs, when executed by the one or more processors, cause the device to modify the transparency of the first virtual object in the region corresponding to the overlap between the first virtual object and the second virtual object in response to determining to modify the transparency of the first virtual object based on the coherency metric.

* * * * *